United States Patent [19]

Roberts

[11] Patent Number: 5,769,186
[45] Date of Patent: Jun. 23, 1998

[54] WHEEL CHOCK FOR TANDEM WHEELS

[76] Inventor: Fred H. Roberts, 3635 Fairlane St., High Point, N.C. 27265

[21] Appl. No.: 816,857

[22] Filed: Mar. 13, 1997

[51] Int. Cl.⁶ .................................................... B60T 1/04
[52] U.S. Cl. ............................................ 188/32; 188/2 R
[58] Field of Search .................................. 188/2 R, 4 R, 188/32, 36, 74; 410/30, 49; D12/217

[56] References Cited

U.S. PATENT DOCUMENTS

| | | | |
|---|---|---|---|
| 3,059,728 | 10/1962 | McKuskie | 188/2 |
| 3,695,394 | 10/1972 | Carpenter | 188/32 |
| 3,760,906 | 9/1973 | McGee | 188/4 R |
| 4,694,936 | 9/1987 | Jackson | 188/2 R |
| 4,715,480 | 12/1987 | Anderson | 188/74 |
| 4,828,076 | 5/1989 | Fox | 188/32 |
| 4,911,270 | 3/1990 | Hudson | 188/32 |
| 4,934,489 | 6/1990 | Jackson | 188/32 |
| 5,158,158 | 10/1992 | Balogh et al. | 188/2 R |
| 5,368,134 | 11/1994 | Rickman et al. | 188/2 R |
| 5,392,880 | 2/1995 | Christian | 188/32 |
| 5,490,582 | 2/1996 | Trowbridge | 188/2 R |
| 5,547,045 | 8/1996 | Stutzman | 188/2 R |

*Primary Examiner*—Robert J. Oberleitner
*Assistant Examiner*—Chris Schwartz
*Attorney, Agent, or Firm*—Rhodes, Coats & Bennett, L.L.P.

[57] ABSTRACT

A wheel chock for tandem wheels including upper and lower spaced apart wedge members sized and configured for wedging engagement with facing surfaces of the tandem wheels. A threaded rod joins the upper and lower wedge members. The threaded rod is connected to each of the upper and lower wedge members such that rotation of the rod in a first prescribed direction causes translational movement of each of the upper and lower wedge members along the rod and toward one another, and such that rotation of the rod in a second prescribed direction causes translational movement of each of the upper and lower wedge members along the rod and away from one another. At least one of the upper and lower wedge members includes a longitudinal bore formed therein, a transverse bore formed therein and intersecting the longitudinal bore, and a pivot nut having a body and a threaded nut bore formed therethrough. The body is disposed within the transverse bore such that the threaded nut bore is positioned at an intersection of the longitudinal and transverse bores. A portion of the rod is disposed in the longitudinal bore and threadedly engages the pivot nut.

17 Claims, 4 Drawing Sheets

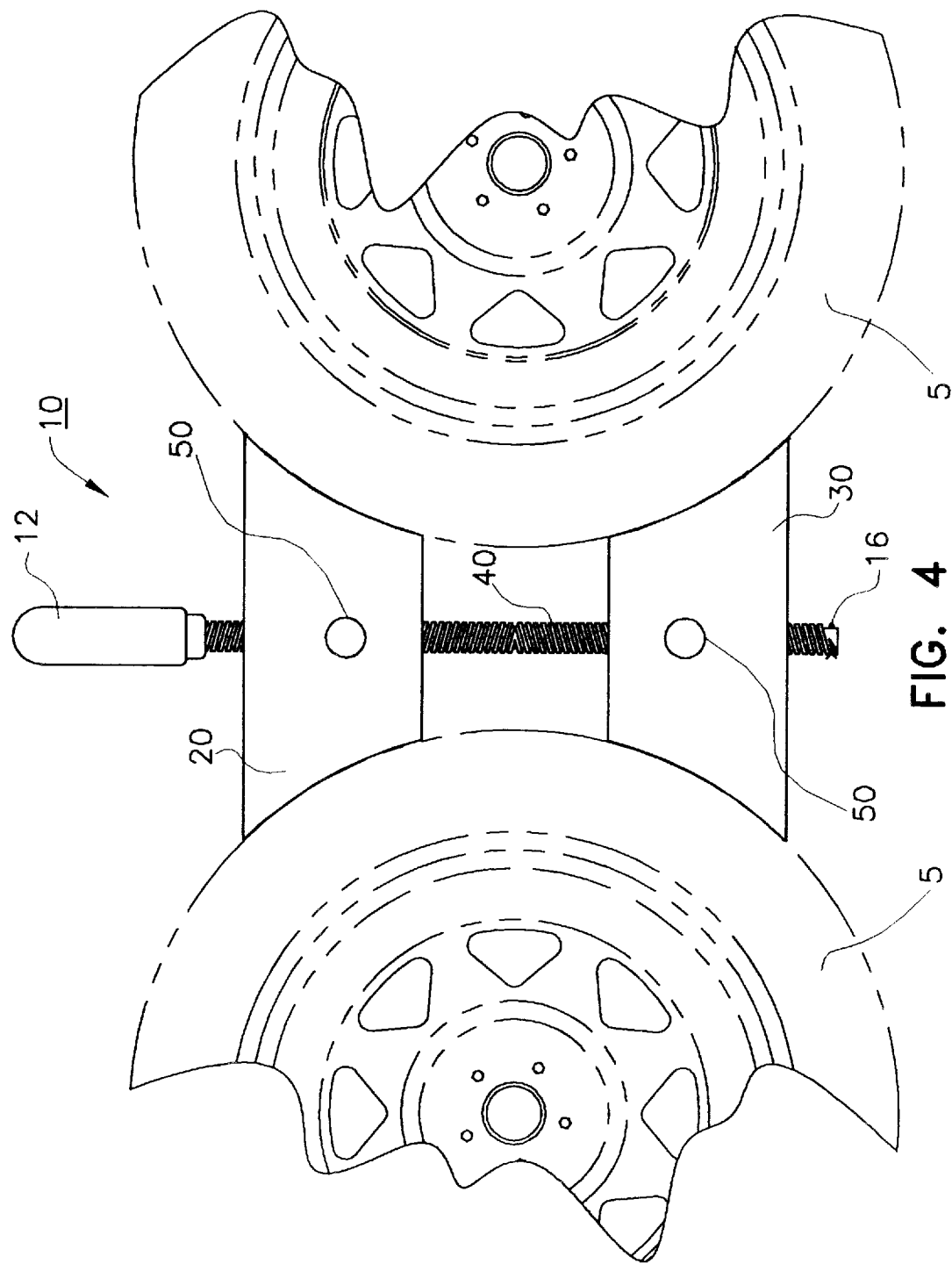

5,769,186

WHEEL CHOCK FOR TANDEM WHEELS

FIELD OF THE INVENTION

The present invention is directed to wheel chocks and, more particularly, to a wheel chock for tandem wheels.

BACKGROUND OF THE INVENTION

Wheel chocks of various designs are commonly employed to prevent a wheeled vehicle, trailer, or the like from rolling while in a parked condition. Devices used range from a common wedge placed between a tire and a support surface to relatively complex devices. Such relatively complex devices include assemblies which may be placed between adjacent wheel peripheries and expanded or otherwise adjusted to provide frictional engagement between the assembly and each of the wheels. Many such devices are tightened and placed by means of a racheting mechanism or a jack mechanism. Others use a threaded engagement to move one wedge with respect to another wedge. Examples of the latter type device include those disclosed in U.S. Pat. No. 5,392,880 to Christian and U.S. Pat. No. 4,934,489 to Jackson.

The patent to Christian discloses a tire chock for tandem wheels comprising upper and lower opposing wedges which are sized for wedging engagement with facing tire tread surfaces of tandem wheels to stop wheel rotation. Each wedge has arcuate diverging engagement surfaces generally conforming to the curvature of the tire tread surfaces. A threaded bar joins the upper and lower wedges and connects thereto so that rotation of the bar moves the wedges toward and away from each other. Also included is a handle connected to the bar for rotating the bar for moving the wedges toward and away from each other. As disclosed, the rod is not threaded along its upper portion. There does not appear to be any disclosure in the patent as to how the threaded rod engages the lower wedge and element 34 is not referenced in the specification. The device of Christian suffers from at least three significant drawbacks. First, because only the lower wedge is threadedly engaged with the rod, only the lower wedge is translated upon rotation of the threaded rod. Accordingly, many rotations of the threaded rod are needed to install and remove the wheel chock. Second, it appears that element 34 is a threaded bore, and in any event, such a feature would be necessary for the chock as described to function as described. As a result, in the manufacture of the chock, a relatively long threaded bore must be formed in the lower wedge. Such provision requires special machining. Third, the threads of the threaded bore of the lower wedge must be formed in a material having sufficient strength to withstand the tightening of the threaded rod. Thus, at least the lower wedge must be formed of a selectively chosen material. For example, while it would be desirable to use plastic for the lower wedge because it is relatively inexpensive and convenient to mold and otherwise work, plastic could not be used because it does not have sufficient strength for the intended use.

The patent to Jackson discloses an auxiliary locking brake for tandem tires formed by upper and lower wedge members centrally joined by a threaded shaft moving the wedge members toward and away from each other for impinging confronting tread surfaces of tandem tires when disposed therebetween. Threaded rod 16 is mounted in upper assembly 12 such that longitudinal movement of shaft 16 relative to assembly 30 of assembly 12 is prevented by washer 62 (see columns 21 to 25). A nut 64 threadedly receives shaft 16 and is anchored to the bottom surface of telescoping assembly 30' of lower assembly 14. In operation, only lower assembly 14 translates along the length of shaft 16. Accordingly, the upper wedge of Jackson likewise does not translate along the threaded rod as the rod is rotated. Moreover, the tandem tire brake is constructed from numerous pieces, detracting from it's appearance, usability, and integrity.

Thus, there exists a need for a wheel chock for tandem tires which may be used to effectively prevent rotation of the wheels. There exists a need for such a wheel chock which is easy to use. The wheel chock should be cost effective to manufacture.

SUMMARY OF THE INVENTION

The present invention is directed generally to a wheel chock for tandem wheels which is effective in preventing rotation of the wheels yet is easy to use. Moreover, the present invention is directed to such a device which may be cost effectively manufactured.

The present invention is directed to a wheel chock for tandem wheels including upper and lower spaced apart wedge members sized and configured for wedging engagement with facing surfaces of the tandem wheels. A threaded rod joins the upper and lower wedge members. The rod is connected to each of the upper and lower wedge members such that rotation of the rod in a first prescribed direction causes translational movement of each of the upper and lower wedge members along the rod and toward one another, and such that rotation of the rod in a second prescribed direction causes translational movement of each of the upper and lower wedge members along the rod and away from one another.

Preferably, the rod is threaded on an upper portion thereof in a first thread direction and is threaded on a lower portion thereof in a second thread direction which is opposite to the first thread direction. Further, a longitudinal bore may be formed through each of the upper and lower wedge members. Each of the longitudinal bores has a threaded portion therein. The upper portion of the rod is disposed within the bore of the upper wedge member and the lower portion is disposed within the bore of the lower wedge member. The threaded portion of the upper wedge member is complementary to and engages the thread of the upper portion and the threaded portion of the lower wedge member is complementary to and engages the thread of the lower portion.

The present invention is further directed to a wheel chock for tandem wheels including upper and lower wedge members sized and configured for wedging engagement with facing surfaces of the tandem wheels wherein at least one of the upper and lower wedge members includes a longitudinal bore formed therein, a transverse bore formed therein and intersecting the longitudinal bore, and a pivot nut having a body and a threaded nut bore formed therethrough. The body is disposed within the transverse bore such that the threaded nut bore is positioned at an intersection of the longitudinal and transverse bores. An externally threaded rod joins the upper and lower wedges. A portion of the rod is disposed in the longitudinal bore and threadedly engages the pivot nut such that rotation of the rod in a first direction moves at least one wedge member along the rod and toward the other of the upper and lower wedge members, and rotation of the rod in second direction moves the wedge member along the rod and away from the other wedge member.

Preferably, each of the wedge members is constructed as described above. Threads of a first thread direction may be formed on a first portion of the rod and threads of a second thread direction may be formed on a second portion of the rod, the second thread direction being opposite the first thread direction. Preferably, the wedge member includes a block formed of plastic, the longitudinal and transverse bores are formed in the block, and the pivot nut is formed of metal.

The present invention is further directed to a wheel chock for tandem wheels having the features of each of the above described wheel chocks. Further, the wheel chocks may include a handle for selectively rotating the rod in each of the first and second prescribed directions. Preferably, in each of the above described wheel chocks, each of the upper and lower wedge members has arcuate diverging engagement surfaces generally conforming to curvatures of the facing surfaces of the wheel.

An object of the present invention is to provide a wheel chock for tandem wheels which is effective in preventing rotation of the wheels.

A further object of the present invention is to provide such a wheel chock which is easy to use.

Moreover, an object of the present invention is to provide such a wheel chock which may be cost effectively manufactured.

Yet another object of the present invention is to provide a wheel chock as described above having wedge members, and wherein the wedge members may be molded of plastic.

Other aspects and advantages of the present invention will become apparent to those of ordinary skill in the art after a reading of the following description of the preferred embodiments when considered with the accompanying drawings.

BRIEF DESCRIPTION OF THE DRAWINGS

FIG. 4 is a front elevational view of the wheel chock installed between a pair of tandem wheels.

DETAILED DESCRIPTION OF THE PREFERRED EMBODIMENT

Figure 1:
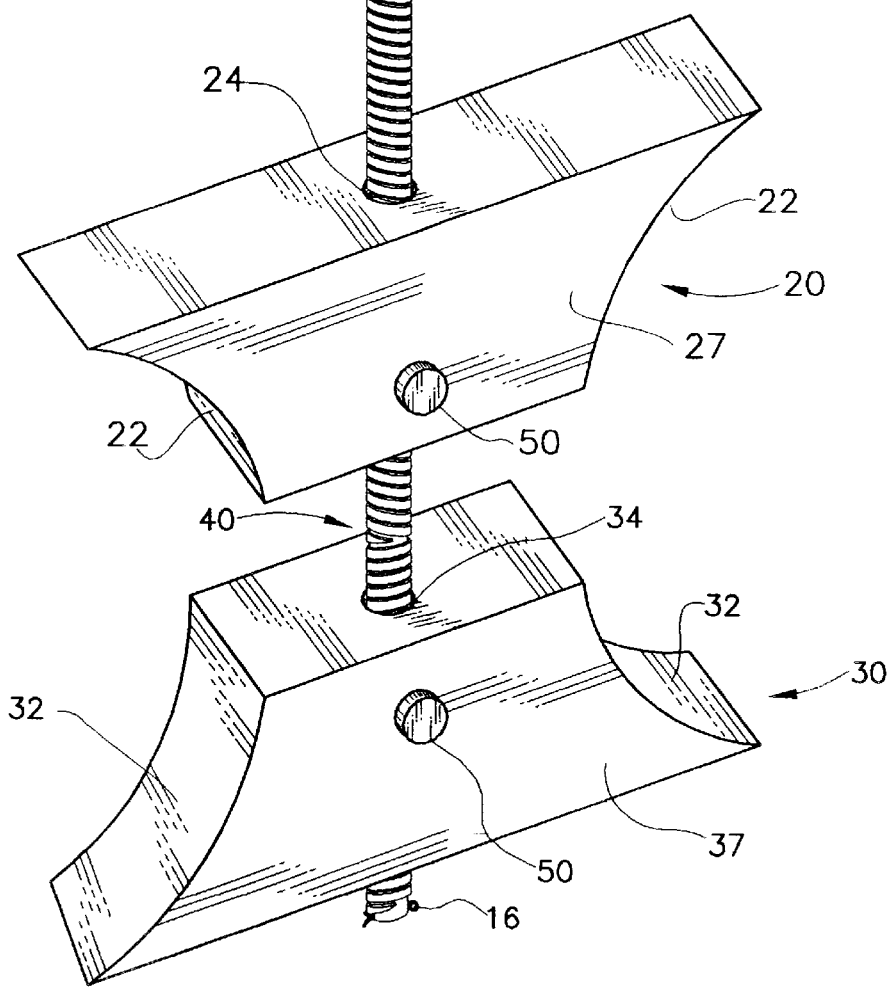
FIG. 1 is a front, perspective view of the wheel chock according to the present invention.

A wheel chock according to a preferred embodiment of the present invention is shown in FIGS. 1 to 4 and generally denoted by the numeral 10. As best seen in FIG. 1, wheel chock 10 includes upper wedge member 20 and lower wedge member 30 each mounted on threaded rod 40. Upper wedge member 20 includes block 27 having arcuate engagement surfaces 22 and lower wedge member 30 includes block 37 having arcuate engagement surfaces 32. Handle 12 is secured to the upper end of rod 40 by spring pin 14 so that rod 40 rotates in either direction with the handle.

With reference to FIG. 4, wheel chock 10 may be used in the following manner. As discussed in more detail below, when rod 40 is rotated in a clockwise direction X upper wedge member 20 translates downwardly along the rod and lower wedge member 30 translates upwardly along the rod. As a result, upper wedge member 20 and lower wedge member 30 are urged together. In use, rod 40 is first rotated in a counter clockwise direction Y to separate wedge members 20 and 30 from one another a sufficient distance to allow wheel chock 10 to be slid in between adjacent tandem wheels 5. Cotter pin 16 serves to prevent lower wedge assembly 30 from moving below the lower end of rod 40. It will be appreciated that the term "wheels" as used herein includes tires mounted on the wheels as are typically present. Once wheel chock 10 is in place, the operator rotates rod 40 clockwise by means of handle 12 until engagement surfaces 22, 32 tightly engage the opposed peripheries of the tires of opposed wheels 5. In this way, as will be readily appreciated by those of ordinary skill in the art, wheel chock 10 frictionally prevents rotation of either of wheels 5.

Figure 2:
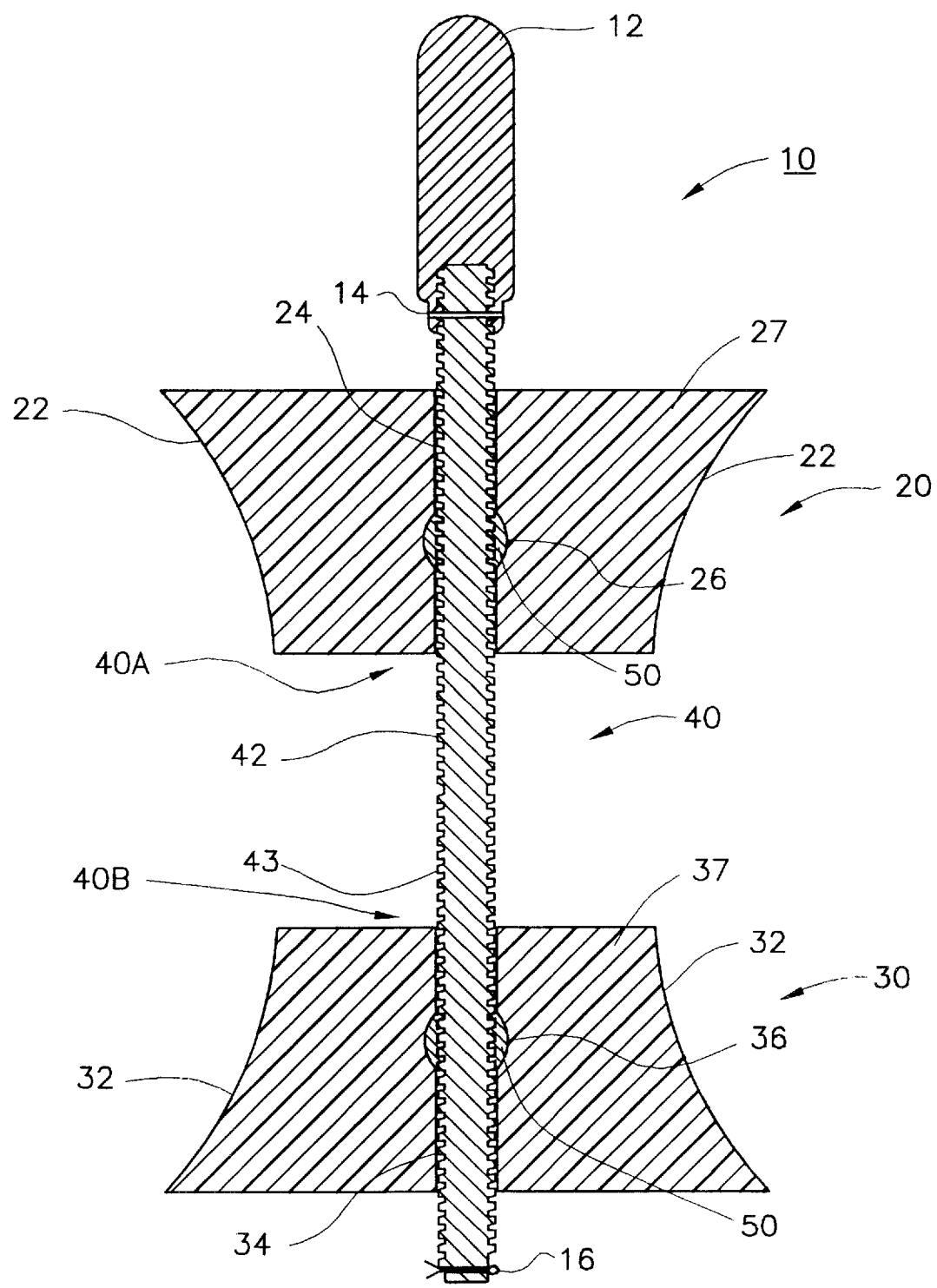
FIG. 2 is a front, cross-sectional view of the wheel chock as taken down the center with the pivot nuts thereof removed.
Figure 3:
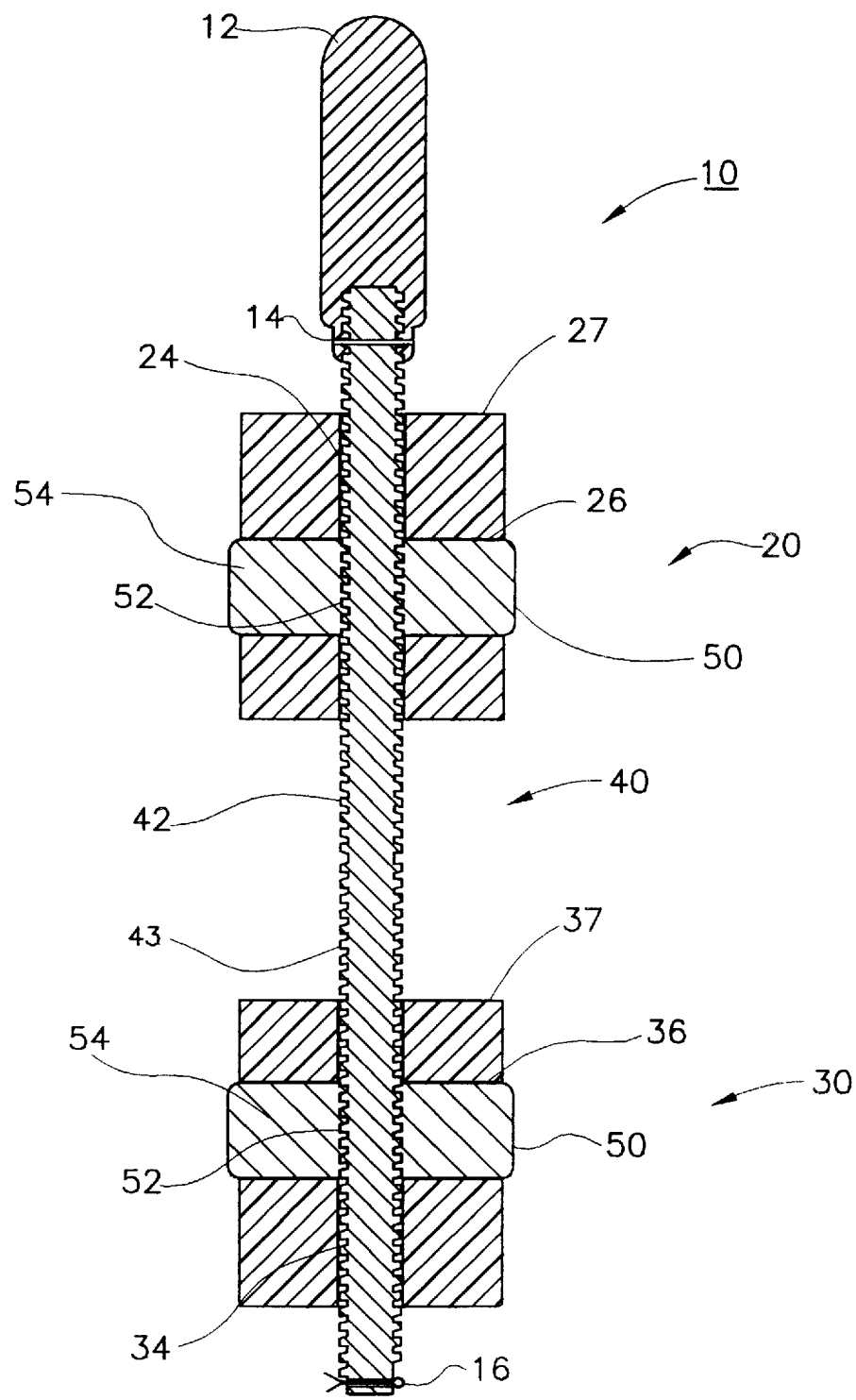
FIG. 3 is a side, cross-sectional view of the wheel chock as taken down the center thereof.

As best seen in FIGS. 2 and 3, upper wedge member block 27 and lower wedge member block 37 have longitudinal bore 24 and longitudinal bore 34, respectively, formed therethrough. Longitudinal bores 24, 34 are preferably smooth and have a diameter slightly greater than the outer diameter of threads 42, 43 of rod 40. Transverse bores 26 and 36 are formed through upper block 27 and lower block 37, respectively. Transverse bore 26 intersects longitudinal bore 24 and transverse bore 36 intersects longitudinal bore 34.

Figure 5:
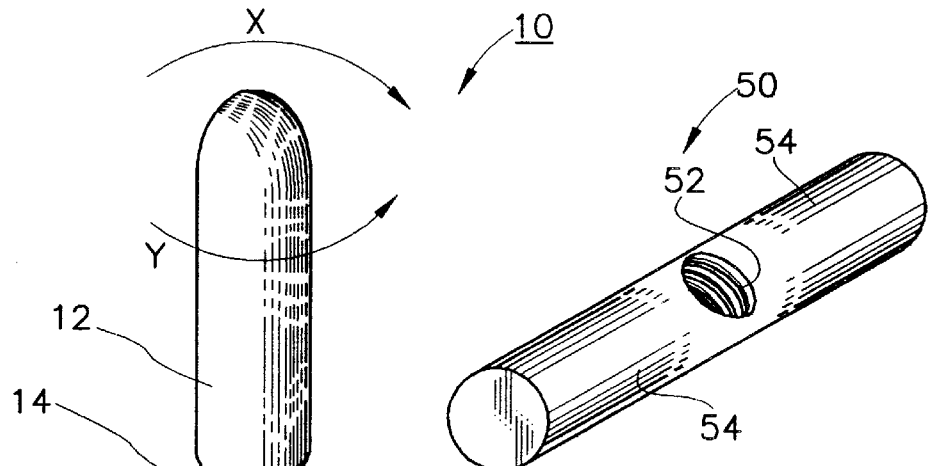
FIG. 5 is a perspective view of a pivot nut forming a part of the wheel chock.

As best seen in FIGS. 2, 3, and 5, pivot nuts 50, each having a body 54 and a through bore 52, are fitted in each of the upper and lower wedge members. More particularly, each body 54 extends through a respective transverse bore 24, 34 such that the threaded bore 52 is aligned with the respective longitudinal bore 24, 34. Preferably, each body 54 is sized and shaped such that it provides a secure fit with the respective transverse bore. Rod 40 extends through longitudinal bore 24, the bore 52 of the upper pivot nut 50, longitudinal bore 34, and the bore 52 of the lower pivot nut 50.

An upper portion 40A of rod 40 has threads 42 of a first direction formed on it's outer periphery. A lower portion 40B has threads 43 of a second direction formed on it's outer periphery. As shown, the threads of bores 52 of the pivot nuts 50 are each complementary to the respective threads 42 and 43 which pass therethrough. It will be appreciated that identical pivot nuts 50 may be used for each of the upper and lower wedge members, the lower pivot nut being rotated 180° with respect to the upper pivot nut.

Rod 40 is preferably formed from cold rolled steel or stainless steel. Threads 42, 43 may be formed by any suitable means, for example, a lathe. Pivot nuts 50 are preferably formed from cold rolled steel or stainless steel. Suitable pivot nuts are readily available or may be formed by any suitably equipped machine shop. Blocks 27, 37 may be formed of any suitable material. In particular, blocks 27, 37 may be formed from molded plastic. If the blocks are formed from molded plastic, bores 24, 26, 34, 36 may be formed during the molding step. Further, engaging surfaces 22, 32 may be formed during the molding. It will be appreciated that the blocks, if molded from plastic, will provide substantial savings in the cost of manufacture and will also provide a relatively light weight wheel chock.

Wheel chock 10 may be assembled in the following manner. Bores 24, 26, 34, 36 and engagement surfaces 22, 32 are molded or machined into blocks 27 and 37. Pivot nuts 50 are inserted into transverse bores 26, 36 such that bores 52 thereof are properly aligned. Upper wedge member 20 is threaded down rod 40 and lower wedge member 30 is threaded up rod 40. Handle 12 is secured to the upper end of rod 40 by spring pin 14 and cotter pin 16 is inserted through a hole formed through the end of rod 40 and secured.

Because both wedge members 20, 30 are translated inwardly or outwardly upon rotation of the rod, the speed and ease with which the wheel chock can be mounted and removed is substantially enhanced as compared to prior art wheel chocks. For a given thread pitch, the wedge embers will selectively converge or diverge at twice the rate of a wheel chock wherein only one wedge is translated. While a preferred embodiment of the present invention has been described, it will be appreciated by those of skill in the art that certain modifications may be made without departing from the scope of the present invention. All such modifications are intended to come within the scope of the claims which follow.

What is claimed is:

1. A wheel chock for tandem wheels, comprising:
    a) upper and lower spaced apart wedge members sized and configured for wedging engagement with facing surfaces of the tandem wheels, a substantially vertical longitudinal bore formed through each of said upper and lower wedge members, each of said substantially vertical longitudinal bores having an inwardly directed thread disposed therein;
    b) a threaded rod threaded on an upper portion thereof in a first thread direction and threaded on a lower portion thereof in a second thread direction which is opposite to said first thread direction, said upper portion of said rod disposed within said bore of said upper wedge member and said lower portion disposed within said bore of said lower wedge member;
    c) said threaded rod joining said upper and lower wedge members and connected to each of said upper and lower wedge members such that rotation of said rod in a first prescribed direction causes translational movement of each of said upper and lower wedge members along said rod and toward one another, and such that rotation of said rod in a second prescribed direction causes translational movement of each of said upper and lower wedge members along said rod and away from one another;
    d) wherein said inwardly directed thread of said upper wedge member is complementary to and engages said thread of said upper portion of said rod and said inwardly directed thread of said lower wedge member is complementary to and engages said thread of said lower portion of said rod; and
    e) wherein at least one of said upper and lower wedge members includes a pivot nut mounted therein, said pivot nut having a nut bore formed therethrough, and wherein said inwardly directed thread of said at least one of said upper and lower wedge members is formed in said nut bore.

2. The wheel chock of claim 1 wherein said at least one wedge member includes a transverse bore extending transversely to and intersecting said longitudinal bore of said at least one wedge member, said pivot nut including a body having said nut bore formed therethrough, and wherein said body is disposed within said transverse bore such that said nut bore is positioned at an intersection of said longitudinal and transverse bores.

3. The wheel chock of claim 2 wherein said at least one wedge member includes a block formed of plastic, said longitudinal and transverse bores formed in said block, and wherein said pivot nut is formed of metal.

4. The wheel chock of claim 1 wherein each of said upper and lower wedge members includes a pivot nut mounted therein, said inwardly directed threads of said upper and lower wedge members formed in said pivot nuts of said upper and lower wedge members respectively.

5. The wheel chock of claim 1 including a handle for selectively rotating said rod in each of said first and second prescribed directions.

6. The wheel chock of claim 1 wherein each of said upper and lower wedge members has arcuate diverging engagement surfaces generally conforming to curvatures of the facing surfaces of the wheel.

7. A wheel chock for tandem wheels, comprising:
    a) upper and lower wedge members sized and configured for wedging engagement with facing surfaces of the tandem wheels;
    b) at least one of said upper and lower wedge members including:
        i) a substantially vertical longitudinal bore formed therein;
        ii) a transverse bore formed therein and intersecting said substantially vertical longitudinal bore; and
        iii) a pivot nut having a body and a threaded nut bore formed therethrough, said body disposed within said transverse bore such that said threaded nut bore is positioned at an intersection of said longitudinal and transverse bores; and
    c) an externally threaded rod joining said upper and lower wedges, a portion of said rod disposed in said longitudinal bore and threadedly engaging said pivot nut such that rotation of said rod in a first direction causes translational movement of said at least one wedge member and the other of said upper or lower wedge member alone said rod and toward one another, and rotation of said rod in second direction causes translational movement of said at least one wedge member and the other of said upper or lower wedge member along said rod away from one another.

8. The wheel chock of claim 7 wherein said other of said upper and lower wedge members includes:
    a) a second longitudinal bore formed therein;
    b) a second transverse bore formed therein and intersecting said second longitudinal bore;
    c) a second pivot nut having a second body and a second threaded nut bore formed therethrough, said second body disposed in said second transverse bore such that said second threaded nut bore is positioned at an intersection of said second longitudinal and second transverse bores; and
    d) wherein said rod includes a second portion disposed in said second longitudinal bore and threadedly engaging said second pivot nut such that rotation of said rod in said first direction moves said other wedge member along said rod and toward said at least one wedge member, and rotation of said rod in said second direction moves said other wedge member along said rod and away from said at least one wedge member.

9. The wheel chock of claim 8 including threads of a first thread direction formed on said first portion of said rod and threads of a second thread direction formed on said second portion of said rod, and wherein said second thread direction is opposite said first thread direction.

10. The wheel chock of claim 7 wherein said at least one wedge member includes a block formed of plastic, said longitudinal and transverse bores formed in said block, and wherein said pivot nut is formed of metal.

11. The wheel chock of claim 7 including a handle for selectively rotating said rod in each of said first and second prescribed directions.

12. The wheel chock of claim 7 wherein each of said upper and lower wedge members has arcuate diverging engagement surfaces generally conforming to curvatures of the facing surfaces of the wheel.

13. The wheel chock of claim 1 wherein at least one of said upper and lower wedge members is formed of plastic.

14. The wheel chock of claim 7 wherein at least one of said upper and lower wedge members is formed of plastic.

15. A wheel chock for tandem wheels, comprising:
   a) upper and lower wedge members sized and configured for wedging engagement with facing surfaces of the tandem wheels;
   b) each of said upper and lower wedge members including:
      i) a block having arcuate diverging engagement surfaces generally conforming to curvatures of the facing surfaces of the wheel;
      ii) a substantially vertical longitudinal bore formed in said block;
      iii) a transverse bore formed in said block and intersecting said substantially vertical longitudinal bore; and
      iv) a pivot nut having a body and a threaded nut bore formed therethrough, said body disposed within said transverse bore such that said threaded nut bore is positioned at an intersection of said longitudinal and transverse bores;
   c) a threaded rod extending through each of said longitudinal bores of said upper and lower wedge members and threadedly engaging each of said pivot nuts of said upper and lower wedge members such that rotation of said rod in a first prescribed direction causes translational movement of each of said upper and lower wedge members along said rod and toward one another, and such that rotation of said rod in a second prescribed direction causes translational movement of each of said upper and lower wedge members along said rod and away from one another; and
   d) said rod including threads of a first thread direction formed on a first portion of said rod and threads of a second thread direction formed on a second portion of said rod, and wherein said second thread direction is opposite said first thread direction.

16. The wheel chock of claim 15 wherein each of said blocks is formed of plastic and each of said pivot nuts is formed of metal.

17. The wheel chock of claim 15 wherein at least one of said upper and lower wedge members is formed of plastic.

* * * * *